(12) United States Patent
Baumann et al.

(10) Patent No.: US 9,172,102 B2
(45) Date of Patent: Oct. 27, 2015

(54) FUEL CELL SYSTEM HAVING IMPROVED FUEL GAS CIRCULATION

(75) Inventors: Frank Baumann, Mundelsheim (DE); Raphaelle Satet, Tilburg (DE); Birgit Thoben, Gerlingen (DE); Wolfgang Friede, Weinstadt (DE); Uwe Limbeck, Kirchheim Unter Teck (DE)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 13/575,800

(22) PCT Filed: Jan. 17, 2011

(86) PCT No.: PCT/EP2011/050520
§ 371 (c)(1),
(2), (4) Date: Oct. 8, 2012

(87) PCT Pub. No.: WO2011/092070
PCT Pub. Date: Aug. 4, 2011

(65) Prior Publication Data
US 2013/0022885 A1    Jan. 24, 2013

(30) Foreign Application Priority Data

Jan. 27, 2010    (DE) .......................... 10 2010 001 260

(51) Int. Cl.
*H01M 8/02*    (2006.01)
*H01M 8/04*    (2006.01)
*H01M 8/24*    (2006.01)

(52) U.S. Cl.
CPC ...... *H01M 8/04097* (2013.01); *H01M 8/04022* (2013.01); *H01M 8/243* (2013.01); *Y02E 60/50* (2013.01)

(58) Field of Classification Search
CPC ..... Y02E 60/50; Y02E 60/525; Y02E 60/523; H01M 6/38; H01M 8/247; H01M 8/249; H01M 8/04097; H01M 8/1011; H01M 8/04201

USPC .................................................. 429/415, 416
See application file for complete search history.

(56) References Cited

U.S. PATENT DOCUMENTS 5,200,279 A    4/1993   Draper et al.
5,741,605 A    4/1998   Gillett et al.
(Continued)

FOREIGN PATENT DOCUMENTS

| DE | 19517425 | 10/1996 |
|----|----------|---------|
| JP | 3133065  | 6/1996  |
| WO | 9954951  | 10/1999 |

OTHER PUBLICATIONS

PCT/EP2011/050520 International Search Report dated Jul. 13, 2011 (Translation and Original 6 pages).

*Primary Examiner* — Cynthia H Kelly
*Assistant Examiner* — Monique Wills
(74) *Attorney, Agent, or Firm* — Michael Best & Friedrich LLP

(57) ABSTRACT

The invention relates to a fuel cell system (1, 2) having at least one or more fuel cells (10, 30), wherein the fuel cell (10, 30) extends between a first cell end (10a, 30a) and a second cell end (10b, 30b) in a tubular shape, and wherein the fuel cell (10, 30) is mechanically received with the first cell end (10a, 30a) on an inflow distributor unit (11, 33), and wherein a fuel gas flows through the fuel cell (10, 30), the gas entering the first cell end (10a, 30a) and exiting one of the cell ends (10a, 10b, 30a, 30b) as exhaust gas. According to the invention, means (12, 16, 18, 32) are provided which suction at least a part of the exhaust gas exiting the fuel cell (10) and feed said gas to the inflow distributor unit (11, 33) for recirculation.

21 Claims, 3 Drawing Sheets

(56) References Cited

U.S. PATENT DOCUMENTS

| | | |
|---|---|---|
| 7,320,836 B2 | 1/2008 | Draper et al. |
| 2005/0164062 A1* | 7/2005 | An et al. .......... 429/26 |
| 2005/0266288 A1 | 12/2005 | Zafred et al. |
| 2006/0019134 A1* | 1/2006 | Yagi et al. .......... 429/17 |
| 2007/0087254 A1 | 4/2007 | Iyengar et al. |
| 2007/0231635 A1* | 10/2007 | Venkataraman et al. ....... 429/20 |
| 2007/0275282 A1 | 11/2007 | Veyo et al. |
| 2009/0081517 A1 | 3/2009 | Draper et al. |
| 2009/0155640 A1* | 6/2009 | Cui et al. .......... 429/14 |
| 2010/0143814 A1* | 6/2010 | Harrington et al. .......... 429/434 |
| 2012/0189937 A1* | 7/2012 | Dohle et al. .................. 429/456 |

* cited by examiner

FUEL CELL SYSTEM HAVING IMPROVED FUEL GAS CIRCULATION

BACKGROUND OF THE INVENTION

The present invention relates to a fuel cell system having at least one or more fuel cells, wherein the fuel cell extends between a first cell end and a second cell end in tubular form, wherein the fuel cell is mechanically received with the first cell end on an inflow distributor unit, and wherein a fuel gas flows through the fuel cell, entering the first cell end and exiting one of the cell ends as exhaust gas.

Fuel cell systems of the type of interest here concern so-called SOFCs (Solid Oxide Fuel Cells). Fuel cells of this type have a ceramic electrolyte body of tubular form, the tube either being open at both ends or having a closed end side. The tubular basic form can be formed, for example, by electrolyte-supported fuel cells (ESC—Electrolyte-Supported Cells) or by anode-supported fuel cells (ASC—Anode-Supported Cells). The tubular basic form is therefore prescribed either by the electrolyte body or by an anode body. By virtue of the tubular form with two open ends or one closed and one open end, these can therefore be distinguished from planar designs of fuel cells.

The core of such fuel cell systems is formed by cells, in which a fuel gas (e.g. methane, hydrogen, carbon monoxide or a mixture) reacts, with the evolution of current and heat, to form carbon dioxide and water. In this case, natural gas which has been entirely or partially converted beforehand, depending on the system concept, by catalytic pre-reforming to form hydrogen has to be fed to the anode side. In this case, air is fed to the cathode, the cathode usually being applied on the outside in the case of tubular fuel cells, and the fuel gas can flow through the tubular fuel cell and electrochemically interact with the anode applied to the inside of the fuel cell.

Tubular fuel cells are mechanically received on a distributor unit, generally referred to as a manifold. If the fuel cells have an open form, the fuel gas is usually introduced through the first cell end, via which the fuel cell is mechanically received on the distributor unit, and exits the fuel cell via the opposing, second cell end. The fuel gas therefore flows from one end to the other end of the tubular fuel cells, it being possible for a plurality of fuel cells to be received on a distributor unit. If the fuel cells are closed at the second, free end, a lance is introduced into the tubular body of the fuel cell, such that the fuel gas, according to the prior art, is guided through the lance to the closed end of the fuel cell, in order to then flow back between the lance and the inside of the electrolyte body past the anode again in the direction toward the distributor unit.

Tubular fuel cells generally have a greater service life since the single-sided clamping and the small sealing length between the fuel cell and the distributor unit avoid thermo-mechanical stresses. Primarily, seals which are generally formed from solder glass can have a greater stability in the case of operating times of 40 000 to 150 000 hours if they do not have to be arranged in the hot region of the fuel cell system. To increase the service life, it would be expedient, however, to dispense with the use of seals entirely.

In order to obtain uniform feeding of fuel gas into the entire fuel cell and sufficiently effective distribution of the fuel gas in the cell, it is necessary to feed more fuel gas than can be utilized electrochemically via the anode wall for generating current. The ratio of converted fuel gas to fed fuel gas is referred to as the gas utilization level. Excess fuel gas can be burned in an afterburner. It is thereby no longer available for the current generation. Alternatively, excess fuel gas can in some cases be mixed with the fresh fuel gas and fed back to the stack, which is referred to as recirculation. This achieves the advantage that a higher gas flow prevails in the fuel cell system, without it being necessary to burn additional fuel gas. This enables operation with a greater service life combined with a high degree of efficiency. In this case, it is generally the case that between 50% and 90% of the exhaust gas is recirculated.

Fuel cells which are open at the ends give rise to the problem of feeding some of the exhaust gas which contains unburnt fuel gas back to the distributor unit for recirculation. As a result of thermal expansion and further thermal effects, it is often disadvantageous to mechanically clamp the tubular fuel cells both via the first cell end and via the second cell end, for example in order to receive and to dissipate the exhaust gas exiting the second cell end. Consequently, all of the exhaust gas is often burned with a high proportion of fuel gas which has not been utilized by electrochemical reaction.

The object of the invention is therefore that of providing a fuel cell system having improved fuel gas circulation. In particular, it is the object of the invention to provide a fuel cell system having an increased service life. In addition, it is the particular object of the invention to feed unburnt fuel gas for recirculation in an advantageous manner, where at the same time mechanical and thermal loading of the fuel cell and of appropriate sealing elements is minimized.

SUMMARY OF THE INVENTION

The invention includes the technical teaching that provision is made of means which extract at least some of the exhaust gas exiting the fuel cell and feed it to the inflow distributor unit for recirculation.

This achieves the advantage that excess fuel gas can be extracted from the fuel cell in order to be fed back to the anode via recirculation. The means which extract the exiting exhaust gas extract exhaust gas in a controlled manner from the fuel cell, in which case the fuel gas can be extracted completely or merely in part. In the present case, the term "exhaust gas" denotes both the gas which arises from the electrochemical reaction and also excess fuel gas which leaves the anode side of the fuel cell as a mixture as a whole. The residual fuel gas present in the exhaust gas can be subsequently burned or can be fed for recirculation for renewed feeding into the fuel cell via the distributor unit.

The means according to the invention for extracting the exhaust gas can advantageously be used for fuel cells which are in the form of fuel cells which are open at both ends. In this case, the fuel gas can enter the first cell end and exit the second cell end, wherein the extraction means are provided at the second cell end for extracting the exhaust gas. In order to avoid a situation where the fuel cell is clamped at both ends, the extraction means can be arranged at the open, second cell end free of a mechanical connection and in particular free of forces, in such a manner that the mechanical reception of the fuel cells is limited to the first cell end. Consequently, according to a known design, the fuel cells are merely mechanically received on and fluidically connected to the distributor unit, which is in the form of an inflow distributor unit, via the first cell end. Compared to the pressure within the cell, a negative pressure can be generated in the extraction means, such that the exhaust gas exiting the second cell end is at least partially extracted by the means. To this end, the second cell end must not be mechanically connected to the means, since the exhaust gas is extracted from the second cell end or at a certain, limited distance from the second cell end by virtue of the generation of a negative pressure and consequently by virtue of the formation of an extraction action. The invention is based on the fact, in particular, that the exhaust gas is not completely recirculated. As a result, it is not necessary to capture all of the exhaust gas exiting the fuel cell, and therefore the leaktightness does not have to be established completely between the cell end and the extraction means.

According to an advantageous embodiment, the extraction means can have an extraction collection unit in order to extract the exhaust gas from a plurality of fuel cells. The extraction collection unit can have at least one or more openings, into which the second cell end of each of the fuel cells projects or at least upstream of which the latter is arranged. In this case, a gap may be provided between the opening and the second cell end in order to avoid bracing of the cells between the inflow distributor unit and the extraction collection unit. In particular, however, each cell end of the fuel cell system is assigned an opening, into which the cell end projects or upstream of which the cell end is arranged at a preferably small distance.

In addition, at least one extraction hood can be assigned to each opening and can preferably be connected to the extraction collection unit, wherein the extraction hood surrounds the open, second cell end on the outside in particular in such a manner that no or only a minimal quantity of fuel gas or exhaust gas escapes between the second cell end and the extraction hood. In this case, the extraction hood can have a different geometrical form, such that, for example if the extraction hood is formed like a pot, the second cell end is surrounded on the outside. A conical form of the extraction hood which tapers at the end or is closed like a collar can minimize the quantity of the fuel gas which escapes between the second cell end and the extraction hood. If it is desired that a partial quantity of the fuel gas escapes between the second cell end and the extraction hood so that it can then be ignited, the extraction hood may have a bevel in order to bring about controlled flame formation.

A filler, in particular a metal nonwoven or ceramic nonwoven, can advantageously be provided between the second cell end and the extraction hood. In particular, the filler may be formed from a refractory material, where on the one hand the filler prevents an increased quantity of exhaust gas from exiting and on the other hand the residual gas exiting through the filler can be ignited downstream of the filler.

According to a further advantageous embodiment for forming the means for extracting exhaust gas, respective funnels, via which exhaust gas exiting the second cell end is extracted, can be present over the second cell end. Furthermore, the extraction means can comprise a suction line, wherein the funnels are connected to the extraction collection unit or to the suction line, and wherein throttle elements can be arranged in particular in the fluidic connection between the funnels and the suction line or the extraction collection unit. The suction flow of the respective funnels can be made the same by way of the throttle elements, such that a drop in pressure over the length of the suction line is achieved if there are a plurality of funnels, notwithstanding a constant suction power for each funnel.

It is furthermore advantageous that the suction power can be set via the throttle element(s) in such a way that the quantity of extracted exhaust gas and of escaping exhaust gas and of exhaust gas to be ignited can be regulated. For this purpose, in addition to the individual throttle elements, provision may be made of a central throttling system, via which the suction power of all the funnels can be changed centrally. If the suction power is increased, the ratio of exiting gas to gas fed back is changed.

In order to ensure uniform distribution between the cells, the inflow distributor unit and/or the extraction collection unit can be equipped with internal guide plates. In addition to the use of tubular cells having a differing internal diameter, the diameter of the openings in the extraction collection unit can also be varied, or the porosity or quantity of the filler between the opening and the cell can be configured differently. An embodiment with two recirculation compressors at at least two ends of the inflow distributor unit and/or of the extraction collection unit likewise contributes to a more homogeneous gas distribution.

As a further embodiment, the extraction means can have suction elements, which project at least partially into the second cell end of the fuel cells, the suction elements being formed for example as hose or tube elements. Furthermore, bell-like insulators can be provided, and can surround the suction elements in order to extract all of the exhaust gas exiting the second cell end via the suction elements. These bells can be arranged over the suction element. Therefore, the extraction means project at least partially into the cell end.

Provision is advantageously made of at least one compressor, which feeds recirculated exhaust gas from the extraction collection unit or from the suction line to an intake line. The compressor serves for forming a recirculation circuit, in order to feed at least some of the extracted exhaust gas or all of the extracted exhaust gas for allocation, which is routed into the fuel cells via the inflow distributor unit.

It is further advantageous that a reformer can be heated by the ignition of at least some of the fuel gas residues which escape between the second cell end of the fuel cells and the extraction means, said reformer serving for the generation of hydrogen-rich gas from, for example, methane gas or methanol.

The present invention is furthermore directed to a fuel cell system having fuel cells which are in the form of fuel cells which are closed at one end, wherein the extraction means are fluidically connected to the first cell end, such that the fuel gas enters and exits via the first cell end, and wherein provision is preferably made of a lance, through which the fuel gas can be extracted from the fuel cell. This also enables the principle according to the invention of extraction of the exhaust gas for tubular fuel cells which are closed at one end, wherein the exhaust gas is extracted through the lance which extends through the fuel cell.

The extraction means comprise a suction device, for example in the form of a blower or generally of a compressor by way of which a negative pressure is generated at the first cell end in the lance, such that the exhaust gas is extracted by the lance. The lance is preferably fitted to the inflow distributor unit, such that the latter forms at least part of the fluidic connection between the suction device and the lance, such that the fuel gas enters the first cell end annularly around the lance and is extracted as exhaust gas in the region of the second cell end by the lance.

What is therefore proposed according to the invention is a reversal of the direction of flow of the fuel gas or of the exhaust gas compared to the direction of flow known from the prior art. The fuel gas is usually conducted via the lance to the second cell end, where it exits and flushes around the anode fitted on the electrolyte body on the inside. The fuel gas therefore flows annularly around the lance in the direction toward the first cell end and consequently in the direction toward the inflow distributor unit. By contrast, what is proposed in the present case is to draw an annular flow around the lance with unburnt fuel gas into the fuel cell by extraction of the exhaust gas through the lances. Consequently, an advantageous temperature distribution forms and a further reduction in the temperature is made possible in the region of the first cell end of the fuel cell. The hot region is therefore limited to the region of the second cell end.

Furthermore, the advantage is achieved that the fuel cells are attracted by suction onto the inflow distributor unit by way of the flange thereof, and therefore further sealing devices can be dispensed with. In particular, a sufficient sealing action can be achieved by respectively face grinding the site of the flange and also the site of the inflow distributor unit solely by the planar contact.

BRIEF DESCRIPTION OF THE DRAWINGS

Further measures which improve the invention are presented in more detail hereinbelow together with the description of preferred exemplary embodiments of the invention with reference to the figures.

DETAILED DESCRIPTION

Figure 1:
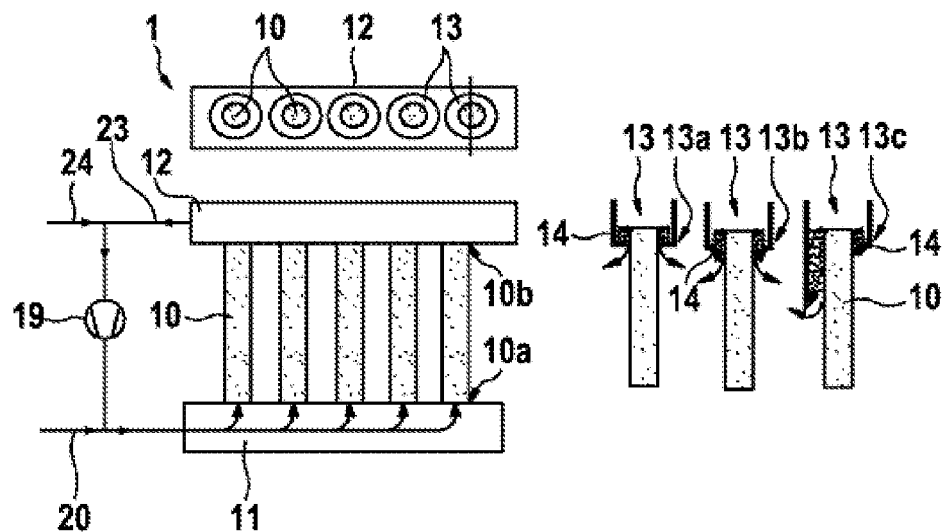
FIG. 1 shows a schematic view of a first exemplary embodiment of the present invention with fuel cells which are open at both ends.

FIG. 1 shows a first exemplary embodiment of a fuel cell system 1 having the features of the present invention. The schematic view shows five fuel cells 10, which are arranged parallel to one another, are in the form of tubular fuel cells 10 and extend from a first cell end 10a to a second cell end 10b. The fuel cells 10 are in the form of fuel cells 10 which are open at both ends, such that fuel gas fed via an inflow distributor unit 11 enters the fuel cell 10 at the first cell end 10a and exits again at the second cell end 10b. The fuel is fed to the inflow distributor unit 11 via an intake line 20 and is apportioned to all the fuel cells 10 by the distributor unit 11. The fuel cells 10 are mechanically received by the inflow distributor unit 11 and extend in the direction of an extraction collection unit 12. The view at the top shows, in a cross section, the fuel cells 10, which extend into openings 13 present in the extraction collection unit 12. A negative pressure is generated in the extraction collection unit 12 or in the openings 13, and by way of this negative pressure the exhaust gas exiting the second cell end 10b is extracted and guided away via an extraction line 23. Some of the exhaust gas extracted via the extraction line 23 is fed back to the intake line 20 via a compressor 19, for example in the form of a blower, so that it can pass back into the fuel cells 10. The principle of recirculation of the exhaust gas can therefore be implemented in the fuel cell system 1. In this case, the feed line 24 is not required. Alternatively, the fuel can be metered by the feed line 24 upstream of the compressor. If the system is operated with a reformer, the latter is to be arranged, for example, upstream of the inflow distributor unit 11.

The magnitude of the negative pressure in the extraction collection unit 12 in relation to the pressure at the respective cell end 10b is such that the exhaust gas can be extracted without air also being attracted via the extraction collection unit 12 through the gap between the opening 13 and the of the fuel cells 10 and being fed to the intake line 20 via the compressor 19 for recirculation. In this case, the negative pressure generated in the extraction collection unit 12 can be such that some of the exhaust gas escapes outward between the openings 13 and the second cell end 10b. Advantageously, the pressure generated in the extraction collection unit 12 is consequently not higher than the pressure of the exhaust gas in the second cell end 10b at any opening.

Extraction hoods 13a, 13b or 13c can be provided at the openings 13, wherein a filler 14, in the form of a metal nonwoven or ceramic nonwoven, for example, can be introduced between the extraction hood 13a, 13b or 13c and the second cell end 10b. The extraction hood 13a surrounds the second cell end 10b like a pot or annularly. On opposing sides, the extraction hood 13b has bevels, with the extraction hood 13c having a continuous bevel to one side. The bevels advantageously bring about a controlled gas flow of the exiting gas. If the exiting gas is ignited, the bevels of the extraction hoods 13b and 13c can achieve controlled flame formation and in particular can reduce the heating of the extraction collection unit. In particular, in a manner which is not shown in more detail, it is possible for a reformer to be arranged above the extraction collection unit 12, said reformer being heated by the producible heat of the escaping, ignited fuel gas. By way of the reformer, methane gas or methanol can be reformed to give carbon monoxide and hydrogen, for example. Alternatively, the heat can be fed for further utilization in the manner of force-heat coupling.

Figure 2:
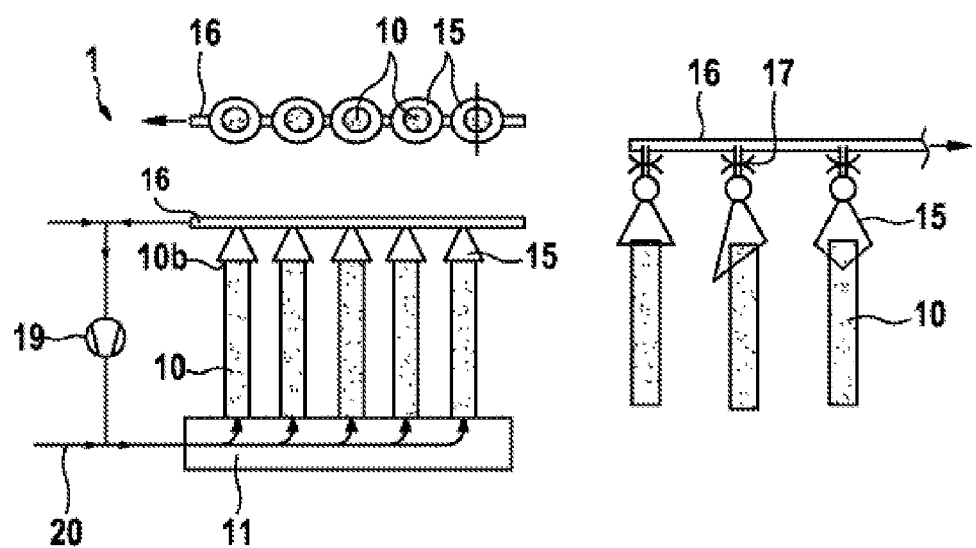
FIG. 2 shows the exemplary embodiment of the present invention as shown in FIG. 1 with a further possible arrangement of the extraction means.

FIG. 2 shows a further embodiment of the means for extracting the exhaust gas which exits the second cell end 10b of the fuel cells 10. The means have funnels 15, into which the second cell ends 10b of the fuel cells 10 project. The funnels 15 are arranged on a common suction line 16, such that extraction of the exhaust gas by the funnels 15 is made possible by virtue of a negative pressure in the suction line 16. Throttle elements 17 are shown by way of example between the funnels 15 and the suction line 16, such that the suction power can be set individually in each funnel 15. According to this embodiment of the extraction means, too, exhaust gas can be fed back from the extraction line 16 to the intake line 20 for recirculation via a compressor 19. Said exhaust gas is in turn apportioned to the fuel cells 10 via the inflow distributor unit 11. The funnels 15 can likewise be configured with different geometric forms, it being possible in particular to provide bevels in order to ignite fuel gas exiting between the second cell end 10b and the funnel 15 with controlled flame formation.

Figure 3:
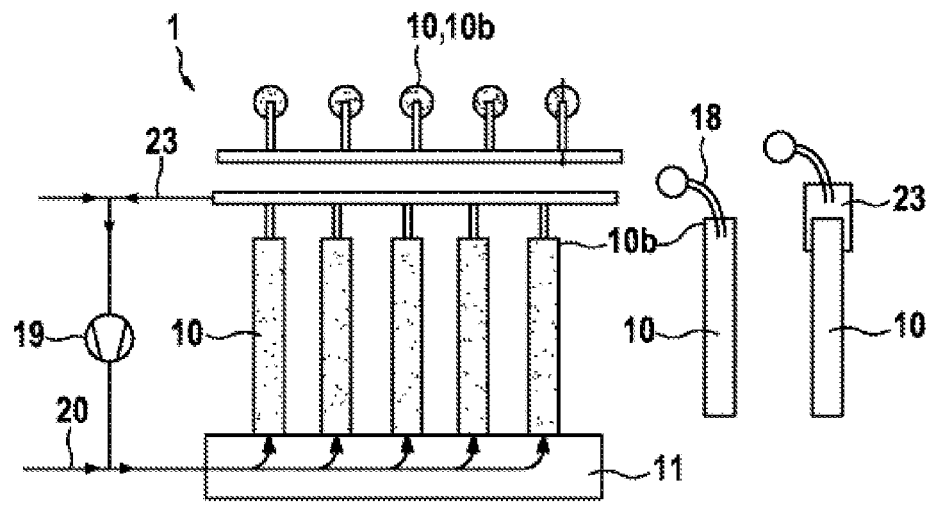
FIG. 3 shows a view of the exemplary embodiment as shown in FIG. 1 with a further configuration of extraction means according to the invention.

FIG. 3 shows means for extracting the exhaust gas from the fuel cells 10 which are in the form of suction elements 18 which project at least partially into the second cell end 10b. A negative pressure is generated in the suction elements 18 via the extraction line 23, and the fuel gas is extracted from the fuel cells 10 in the region of the second cell end 10b. In order to minimize exiting exhaust gas between the suction element 18 and the second cell end 10b, provision may furthermore be made of a bell, which extends around the second cell end 10b. An alternative configuration of the means for extracting the exhaust gas as compared with the embodiments shown in FIG. 1 and FIG. 2 is therefore illustrated. In this case, in a manner which is not shown in more detail, a metal nonwoven or ceramic nonwoven between the cell end 10b and the suction elements 18 can reduce the exiting quantity of gas by closing off the cell like a stopper. The mechanical clamping of the cell ends 10b is then ensured by the flexibility of this nonwoven or by a flexible suction element 18.

Figure 4:
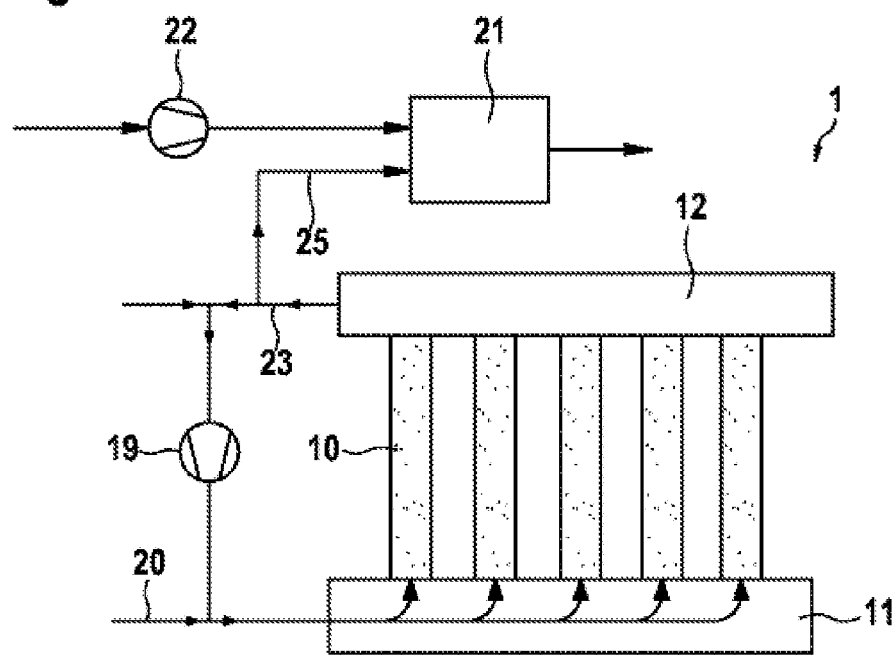
FIG. 4 shows a schematic view of the recirculation and of the further utilization of the extracted exhaust gas as per the exemplary embodiment as shown in FIG. 1.

FIG. 4 schematically shows the fuel cell system 1 having a plurality of fuel cells 10 which are arranged on the inflow distributor unit 11. A negative pressure can in turn be generated via the extraction collection unit 12 via an extraction line 23 in order to extract the exhaust gas, which contains residual constituents of fuel gas, from the fuel cells 10. In this exemplary embodiment, too, a compressor 19 is shown, by way of example, in order to feed some of the extracted exhaust gas back to the intake line 20. More of the extracted exhaust gas can be fed from the extraction line 23 via a secondary flow line 25 to an afterburner 21, which at the same time can be fed with air or cathode exhaust gas via a further compressor 22. By way of example, a reformer can be heated in addition or separately by way of the afterburner 21.

Figure 5:
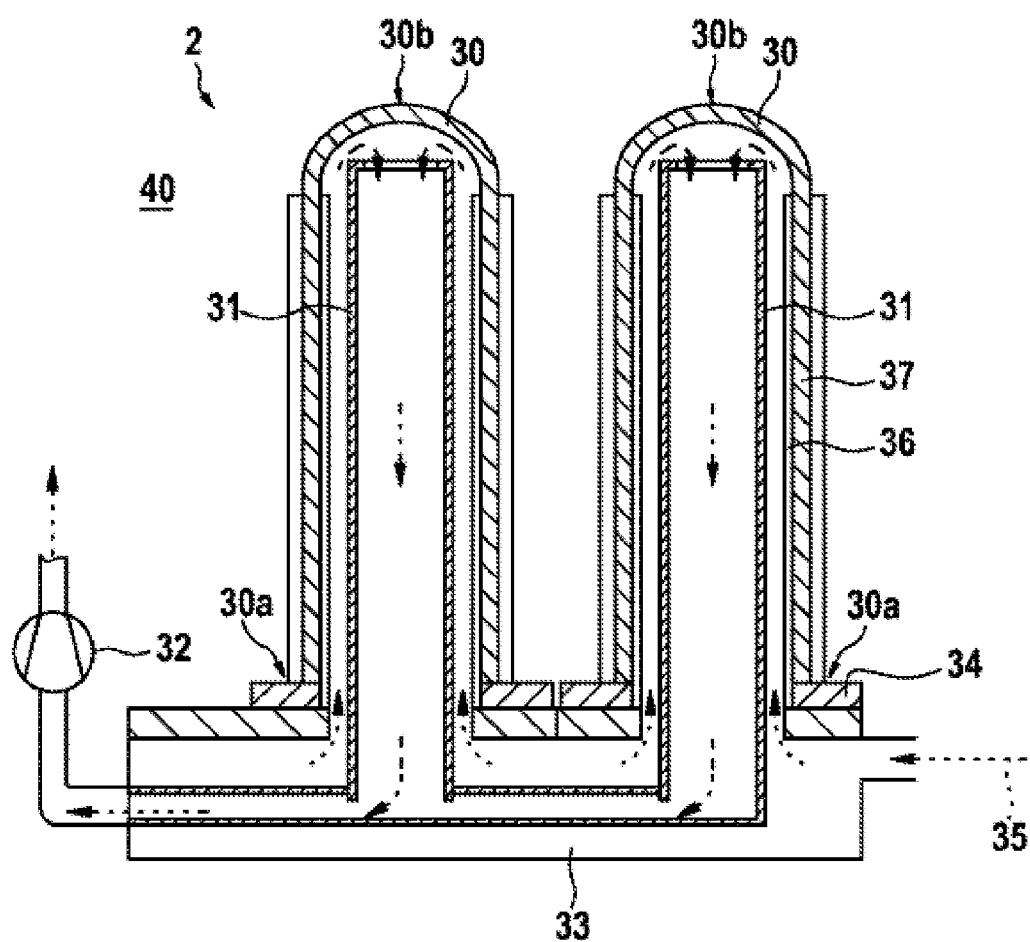
FIG. 5 shows a second exemplary embodiment of a fuel cell system according to the invention having fuel cells which are closed at the end.

FIG. 5 shows a further exemplary embodiment of a fuel cell system 2 according to the present invention. This figure shows two fuel cells 30, which are received on an inflow distributor unit 33. The fuel cells 30 are received by way of a first cell end 30a, the fuel cells 30 preferably being in the form of tubular SOFC fuel cells 30 with an internal anode which have a closed second cell end 30b. The fuel cells 30 have a carrier body which predefines the shape and is formed, for example, by the electrolyte body or the anode body.

Lances 31 are inserted into the fuel cells 30, extending through the fuel cells 30 almost as far as the closed second cell end 30b. The fuel is firstly fed to the inflow distributor unit 33 via a fuel feed 35. The fuel feed 35 is directly fluidically connected to the interior of the fuel cells 30. By contrast, the lances 31 are fluidically connected to a suction device 32, such that a negative pressure is generated in the lances 31 via the suction device 32. The exhaust gas is therefore extracted via the lances 31 and consequently in the region of the second cell end 30b. By virtue of the negative pressure generated in the lances 31, the fuel flows via the fuel feed 35 into the fuel cells 30. In this case, the fuel flows around the lances 31 like a shroud, and therefore flushes around the anodes 36 which are fitted on the inside of the electrolyte bodies 37 of the fuel cells 30.

The electrolyte bodies 37 have a flange 34, which forms a coplanar surface with the top side of the inflow distributor unit 33. If the flanges 34 and the top side of the inflow distributor unit 33 have appropriate face grinding, the fuel cells 30 can be attracted by suction onto the inflow distributor unit 33 by virtue of the pressure ratio generated in the fuel cells 30, which is set in such a way that the pressure on the cathode side 40 (outside) is higher than on the anode side (inside). Sealing means, such as for example solder glass, between the fuel cells 30 and the inflow distributor unit 33 can therefore be avoided.

The embodiment of the invention is not restricted to the preferred exemplary embodiment mentioned above. Rather, a number of variants are conceivable which make use of the solution presented also in the case of embodiments of fundamentally different configuration. All of the features and/or advantages, including design details, physical configurations and process steps, which emerge from the claims, the description or the drawings can be essential to the invention both individually and also in the widest variety of combinations. In particular, the recirculation via the compressor 19 as shown in FIGS. 1, 2, 3 and 4 can also be employed in the exemplary embodiment shown in FIG. 5. In addition, some of the exhaust gas extracted by the suction device 32 can be fed for burning, in order for example to heat a reformer for providing hydrogen-rich gas.

The invention claimed is:

1. A fuel cell system (1, 2) having a plurality of fuel cells (10, 30), wherein each of the fuel cells (10, 30) extends between a first cell end (10a, 30a) and a second cell end (10b, 30b) in tubular form, wherein each of the fuel cells (10, 30) is mechanically received with the first cell end (10a, 30a) on an inflow distributor unit (11, 33) that separately apportions the fuel gas into the first cell end of each of the plurality of fuel cells, and wherein the fuel gas flows through the fuel cells (10, 30), entering the first cell ends (10a, 30a) and exiting either the first cell ends (10a, 30a), the second cell ends (10a, 10b, 30a, 30b), or a combination of the first and second cell ends (10a, 10b, 30a, 30b) as exhaust gas, characterized in means (12, 16, 18, 32) which extract at least some of the exhaust gas exiting the fuel cells (10) and feed it to the inflow distributor unit (11, 33) for recirculation are provided, wherein the extraction means (12, 16, 18) have an extraction collection unit (12) in order to extract the exhaust gas from the plurality of fuel cells (10), and wherein the extraction collection unit (12) is provided with openings (13), into which the second cell ends (10b) of the fuel cells (10) project.

2. The fuel cell system (1) as claimed in claim 1, characterized in that the plurality of fuel cells (10) are in the form of fuel cells (10) which are open at both ends, such that the fuel gas enters the first cell end (10a) of the plurality of fuel cells (10) and exits the second cell ends (10b) of the plurality of fuel cells (10), wherein the extraction means (12, 16, 18) are provided at the second cell ends (10b) of the plurality of fuel cells (10) for extracting the exhaust gas.

3. The fuel cell system (1) as claimed in claim 2, characterized in that the extraction means (12, 16, 18) are arranged at the open, second cell ends (10b) free of a mechanical connection and free of forces, in such a manner that the mechanical reception of the fuel cells (10) is limited to the first cell ends (10a).

4. The fuel cell system (1) as claimed in claim 1, characterized in that extraction hoods (13a, 13b, 13c) are assigned to the openings (13) and are connected to the extraction collection unit (12), wherein the extraction hoods (13a, 13b, 13c) surround the second cell ends (10b) in such a manner that no or only a minimal quantity of fuel gas or exhaust gas escapes between the second cell ends (10b) and the extraction hoods (13a, 13b, 13c).

5. The fuel cell system (1) as claimed in claim 4, characterized in that a filler (14) is provided between the second cell ends (10b) and the extraction hoods (13a, 13b, 13c).

6. The fuel cell system (1) as claimed in claim 1, characterized in that respective funnels (15), via which exhaust gas exiting the second cell ends (10b) can be extracted, are fitted over the second cell ends (10b).

7. The fuel cell system (1) as claimed in claim 6, characterized in that the extraction means (12, 16, 18) comprise a suction line (16) and an extraction collection unit (12), wherein the funnels (15) are connected to the extraction collection unit (12) or to the suction line (16), and wherein throttle elements (17) are arranged in the fluidic connection between the funnels (15) and the suction line (16) or the extraction collection unit (12).

8. The fuel cell system (1) as claimed in claim 6, characterized in that exhaust gas escaping between openings (13) in the extraction means (12, 16, 18) and the funnels (15) contains residues of fuel gas, which are ignited, wherein a reformer is provided and is arranged in such a manner that heat can be introduced into the reformer by the ignited gas.

9. The fuel cell system (1) as claimed in claim 1, characterized in that the extraction means (12, 16, 18) have suction elements (18), which project at least partially into the second cell ends (10b).

10. The fuel cell system (1) as claimed in claim 7, characterized in that provision is made of at least one compressor (19), which feeds recirculated exhaust gas from the extraction collection unit (12) or from the suction line (16) to an intake line (20).

11. The fuel cell system (1) as claimed in claim 1, characterized in that the extraction collection unit (12) is provided with openings (13) upstream of which the second cell ends (10b) are arranged.

12. The fuel cell system (1) as claimed in claim 11, characterized in that extraction hoods (13a, 13b, 13c) are assigned to the openings (13) and are connected to the extraction collection unit (12), wherein the extraction hoods (13a, 13b, 13c) surround the second cell ends (10b) in such a manner that no or only a minimal quantity of fuel gas or exhaust gas escapes between the second cell ends (10b) and the extraction hoods (13a, 13b, 13c).

13. The fuel cell system (1) as claimed in claim 12, characterized in that a filler (14) is provided between the second cell ends (10b) and the extraction hoods (13a, 13b, 13c).

14. The fuel cell system (1) as claimed in claim 13, characterized in that the filler (14) is a metal nonwoven or ceramic nonwoven.

15. The fuel cell system (1) as claimed in claim 5, characterized in that the filler (14) is a metal nonwoven or ceramic nonwoven.

16. A fuel cell system (1, 2) having a plurality of fuel cells (10, 30), wherein each of the fuel cells (10, 30) extends between a first cell end (10a, 30a) and a second cell end (10b, 30b) in tubular form, wherein each of the fuel cells (10, 30) is mechanically received with the first cell end (10a, 30a) on an inflow distributor unit (11, 33) that separately apportions the fuel gas into the first cell end of each of the plurality of fuel cells, and wherein the fuel gas flows through the fuel cells (10, 30), entering the first cell ends (10a, 30a) and exiting either the first cell ends (10a, 30a), the second cell ends (10a, 10b, 30a, 30b), or a combination of the first and second cell ends (10a, 10b, 30a, 30b) as exhaust gas, characterized in means (12, 16, 18, 32) which extract at least some of the exhaust gas exiting the fuel cells (10) and feed it to the inflow distributor unit (11, 33) for recirculation are provided, wherein respective funnels (15), via which exhaust gas exiting the second cell ends (10b) can be extracted, are fitted over the second cell ends (10b).

17. The fuel cell system (1) as claimed in claim 16, characterized in that the extraction means (12, 16, 18) comprise a suction line (16) and an extraction collection unit (12), wherein the funnels (15) are connected to the extraction collection unit (12) or to the suction line (16), and wherein throttle elements (17) are arranged in the fluidic connection between the funnels (15) and the suction line (16) or the extraction collection unit (12).

18. The fuel cell system (1) as claimed in claim 16, characterized in that exhaust gas escaping between openings (13) in the extraction means (12, 16, 18) and the funnels (15) contains residues of fuel gas, which are ignited, wherein a reformer is provided and is arranged in such a manner that heat can be introduced into the reformer by the ignited gas.

19. A fuel cell system (1, 2) having a plurality of fuel cells (10, 30), wherein each of the fuel cells (10, 30) extends between a first cell end (10a, 30a) and a second cell end (10b, 30b) in tubular form, wherein each of the fuel cells (10, 30) is mechanically received with the first cell end (10a, 30a) on an inflow distributor unit (11, 33) that separately apportions the fuel gas into the first cell end of each of the plurality of fuel cells, and wherein the fuel gas flows through the fuel cells (10, 30), entering the first cell ends (10a, 30a) and exiting either the first cell ends (10a, 30a), the second cell ends (10a, 10b, 30a, 30b), or a combination of the first and second cell ends (10a, 10b, 30a, 30b) as exhaust gas, characterized in means (12, 16, 18, 32) which extract at least some of the exhaust gas exiting the fuel cells (10) and feed it to the inflow distributor unit (11, 33) for recirculation are provided, wherein the extraction means (12, 16, 18) have suction elements (18), which project at least partially into the second cell ends (10b).

20. A fuel cell system (1, 2) having a plurality of fuel cells (10, 30), wherein each of the fuel cells (10, 30) extends between a first cell end (10a, 30a) and a second cell end (10b, 30b) in tubular form, wherein each of the fuel cells (10, 30) is mechanically received with the first cell end (10a, 30a) on an inflow distributor unit (11, 33) that separately apportions the fuel gas into the first cell end of each of the plurality of fuel cells, and wherein the fuel gas flows through the fuel cells (10, 30), entering the first cell ends (10a, 30a) and exiting either the first cell ends (10a, 30a), the second cell ends (10a, 10b, 30a, 30b), or a combination of the first and second cell ends (10a, 10b, 30a, 30b) as exhaust gas, characterized in means (12, 16, 18, 32) which extract at least some of the exhaust gas exiting the fuel cells (10) and feed it to the inflow distributor unit (11, 33) for recirculation are provided, wherein the plurality of fuel cells (30) are in the form of fuel cells (30) which are closed at one end, wherein the extraction means (32) are fluidically connected to the first cell ends (30a) of the plurality of fuel cells (30), such that the fuel gas enters and exits via the first cell ends (30a) of the plurality of fuel cells (30), wherein provision is made of lances (31), through which the fuel gas can be extracted from the plurality of fuel cells (30), and wherein the extraction means (32) comprise a suction device (32), the suction end of which is fluidically connected to the first cell ends (30a) of the plurality of fuel cells and to the lances (31).

21. The fuel cell system (2) as claimed in claim 20, characterized in that the inflow distributor unit (33) forms at least part of a fluidic connection between the suction device (32) and the lances (31), such that the fuel gas enters the first cell ends (30a) of the plurality of fuel cells (30) annularly around the lances (31) and can be extracted as exhaust gas in the region of the second cell ends (30b) of the plurality of fuel cells (30) by the lances (31).

* * * * *